Patented Jan. 26, 1932

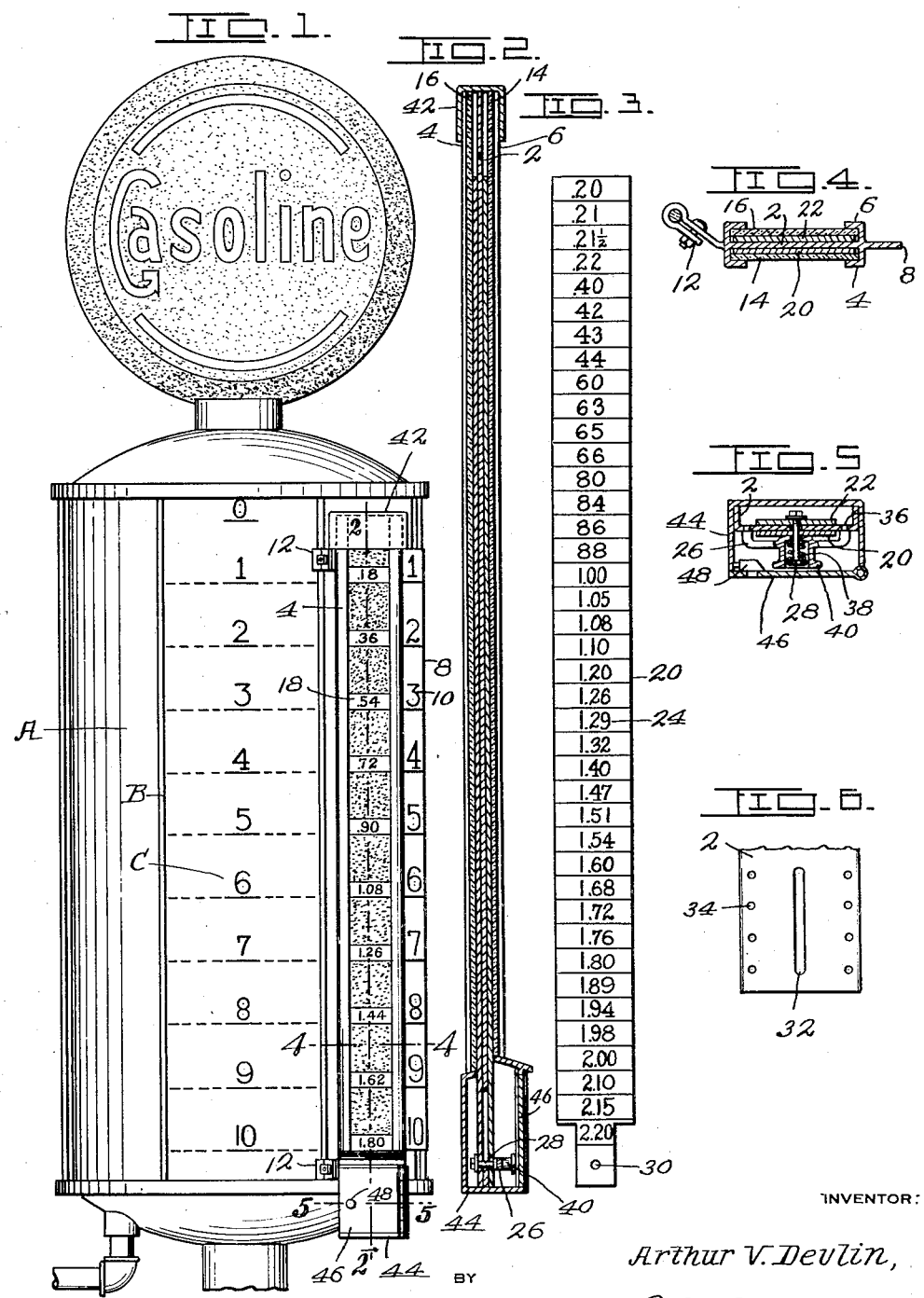

1,842,662

UNITED STATES PATENT OFFICE

ARTHUR V. DEVLIN, OF CASCADE, IOWA

GASOLINE PRICE COMPUTING CHART

Application filed March 27, 1930. Serial No. 439,381.

My invention relates to price computing charts for attachment to containers of the type used in measuring and dispensing gasoline at filling stations, and my object is to provide a chart which will accurately indicate the price of one or more gallons of gasoline and thereby avoid the mistakes which sometimes occur when the charge for more than one gallon is mentally computed.

In many instances gasoline sells at a price ending in fractions which makes it more or less difficult for the attendant to quickly and accurately compute the correct price of more than one gallon of gasoline, but by the use of my chart the correct price can be instantly determined by a glance at said chart.

The invention is adjustable to meet the changes often made in the price of gasoline, and in order that the invention may be fully understood reference will now be had to the accompanying drawings, in which:

Fig. 1 is a front elevation of a measuring and dispensing container equipped with my invention.

Fig. 2 is a vertical section of the chart and its holder taken on line 2—2 of Fig. 1.

Fig. 3 is a detail view of one of the price list cards employed in carrying out the invention.

Fig. 4 is a cross section of the chart and its holder on line 4—4 of Fig. 1.

Fig. 5 is a cross section on line 5—5 of Fig. 1.

Fig. 6 is a broken front elevation of the lower portion of the chart holder.

Referring in detail to the different parts, A designates the container for measuring and dispensing gasoline or other liquids. Said container includes a plurality of vertically disposed rods B and one or more scales C, which latter include a vertically disposed column of uniformly spaced numerals indicating gallons and running, in the present instance from 0 to 10, inclusive. All of the above may be of usual or any preferred type.

Referring now more particularly to the parts constituting the present invention, 2 designates a holder made of suitable material such, for instance, as sheet metal and provided with oppositely disposed front and rear flanges 4 and 6, respectively, and a longitudinal wing 8, which latter is provided preferably on its front and rear surfaces with columns of numerals 10 equal in number to and arranged in horizontal alinement with the numerals of the scale C as shown by Fig. 1. The holder 2 is provided at one side with clamp means 12 whereby it may be firmly secured to one of the rods B adjacent to the scale C.

14 and 16 designate front and rear cover means held in place by the front and rear flanges 4 and 6, respectively, and provided with superimposed clear display spaces 18 arranged approximately in horizontal alinement with the graduations of the scale C. Each of the cover means consists preferably of a glass or translucent plate which is opaque, or approximately so, between the display spaces 18 which may be in the form of openings but consist preferably of clear glass to prevent the entrance of rain to the front and rear computing scales 20 and 22, respectively.

The scale 20 is slidably arranged between the holder 2 and the plate 14, while the scale 12 is slidably arranged between said holder and the plate 16, and each scale consists preferably of card board with a column of numerals 24 indicating different prices per gallon at which the gasoline or other liquid is to be dispensed. The numerals are arranged in sets and as shown by Figs. 1 and 3 scales with different sets may be provided to meet fluctuations in price too great to be accommodated by one scale. The scale disclosed by Fig. 1 starts with the price of 18 cents and has multiples thereof, while the scale shown by Fig. 3 starts with the price of 20 cents and has multiples thereof. Also as shown by Fig. 3, each scale has a plurality of sets of numerals, four different sets being shown in the present instance for meeting as many fluctuations in the price at which the gasoline may be sold. If the price per gallon of the gasoline is changed more than four times a scale with other sets of numerals is substituted to meet the variations in price. The numbers of each set are spaced apart distances equal to the distance from the top of one clear space 18 to the top of the following clear space so that when the initial number of any set appears at the upper space the remaining numbers of the set will simultaneously appear at the following spaces as shown by Fig. 1.

Suitable means for simultaneously adjusting the scales 20 and 22 vertically, to bring any set of numbers into registry with the display spaces 18 is provided and consists in the present instance of a dog 26 provided with a bolt 28 extending through holes 30 and a slot 32. The holes 30 register with each other and are arranged in the lower portions of the scales 20 and 22, while the slot 32 extends longitudinally of the lower portion of the holder 2, which latter is also provided with oppositely disposed rows of holes 34 equal in number to the sets of numerals 24 of each computing scale. The dog 26 is provided with reduced terminals 36 which are adapted to be forced into any pair of holes 34 by means of a coil spring 38 interposed between the adjacent portion of the dog 26 and the head of the bolt 28. A handle 40 is formed on the dog 26 so that it may be pulled backwardly to withdraw the terminals 36 from the holes 34 when it is desired to raise or lower the scales 20 and 22. As shown by Fig. 5, the handle 40 is made tubular in form to enclose the spring 38 and that portion of the bolt 28 embraced by said spring.

42 designates a cap removably mounted upon the upper portion of the holder 2 to prevent the entrance of rain, and 44 designates a housing which cooperates with the cover means 14 and 16 and the cap 42 in excluding rain from the scales 20 and 22. The housing 44 is located at the lower portion of the holder 2 and is of such length as to permit the dog 26 to be adjusted into engagement with any of the holes 34. In order that access may be had to the dog 26 the housing 44 is provided with a door 46 which is preferably equipped with a lock 48 for preventing unauthorized persons from gaining access to the dog and shifting the scales 20 and 22.

When it is desired to reduce the cost of manufacture the rear flanges 6, the wing 8, the rear computing scale and the rear cover means 16 may be dispensed with, but in that case the price of one or more gallons of liquid can be ascertained only from the front side of the device instead of from both the front and rear sides.

From the foregoing description it is apparent that I have provided means whereby the cost of one or more gallons of gasoline or other liquid may be quickly and accurately determined by a glance at either of the scales 20 and 22, so that mistakes arising from incorrect mental computations can be avoided, and while I have shown one form of the invention I reserve all rights to such other forms and modifications as properly fall within the spirit and scope of the invention as claimed.

Having thus described my invention, what I claim and desire to secure by Letters Patent, is:—

A device of the character described consisting of a holder having oppositely disposed rows of holes, a plate supported by said holder and having opaque spaces and superimposed clear spaces which latter are alternately arranged with the former, a computing scale interposed between said plate and said holder and having superimposed sets of numerals facing said plate, said scale being slidably mounted so that any desired set of numerals may be exposed at said clear spaces, a dog secured to said scale and having terminals adapted to enter the holes in the holder, spring means for pressing said dog towards the holes, a handle whereby said dog may be withdrawn from the holes and caused to slide the scale vertically, and a housing enclosing the dog and the handle and provided with a door through which access may be had to said scale.

In testimony whereof I affix my signature.

ARTHUR V. DEVLIN.